(12) United States Patent
Apter

(10) Patent No.: US 9,033,595 B2
(45) Date of Patent: May 19, 2015

(54) FRAME AND INSERT FOR MOUNTING A MOBILE DEVICE TO A TRIPOD

(71) Applicant: PADCASTER LLC, New York, NY (US)

(72) Inventor: Josh Apter, New York, NY (US)

(73) Assignee: PADCASTER LLC, New York, NY (US)

(*) Notice: Subject to any disclaimer, the term of this patent is extended or adjusted under 35 U.S.C. 154(b) by 0 days.

(21) Appl. No.: 14/334,155

(22) Filed: Jul. 17, 2014

(65) Prior Publication Data

US 2014/0327817 A1 Nov. 6, 2014

Related U.S. Application Data

(63) Continuation of application No. 13/650,335, filed on Oct. 12, 2012, now Pat. No. 8,807,849.

(60) Provisional application No. 61/622,775, filed on Apr. 11, 2012, provisional application No. 61/627,431, filed on Oct. 12, 2011.

(51) Int. Cl.
| | |
|---|---|
| *G03B 17/56* | (2006.01) |
| *H04N 5/225* | (2006.01) |
| *F16M 13/00* | (2006.01) |
| *F16M 13/02* | (2006.01) |

(52) U.S. Cl.
CPC .............. *H04N 5/2254* (2013.01); *F16M 13/00* (2013.01); *F16M 13/02* (2013.01); *G03B 17/561* (2013.01)

(58) Field of Classification Search
CPC .................................................... G03B 17/561
See application file for complete search history.

(56) References Cited

U.S. PATENT DOCUMENTS

| | | |
|---|---|---|
| D443,632 S | 6/2001 | Johansson |
| 6,738,571 B2 | 5/2004 | Takeda |
| 7,304,837 B2 | 12/2007 | Lo et al. |

(Continued)

FOREIGN PATENT DOCUMENTS

RU 2280959 C2 7/2006

OTHER PUBLICATIONS

Makayama product website www.makayama.com, archived Jan. 12, 2012, https://web.archive.org/web/20120112095553/http://www.makayama.com/moviemount.html. Accessed Jul. 30, 2014.*

(Continued)

*Primary Examiner* — Clayton E Laballe
*Assistant Examiner* — Noam Reisner
(74) *Attorney, Agent, or Firm* — Panitch Schwarze Belisario & Nadel LLP

(57) ABSTRACT

An apparatus for mounting a mobile device on a tripod includes a frame with a rigid peripheral member defining an opening therethrough. The peripheral member includes a mount configured to releasably couple the frame to the tripod. An insert is sized and shaped to be placed into the opening of the frame and releasably engage at least a portion of the peripheral member in an assembled configuration. The insert has a membrane in the form of a cavity configured to releasably receive and support the mobile device. The membrane extends over at least a portion of the opening of the frame in the assembled configuration and includes at least one camera hole extending therethrough that is aligned with a camera lens of the mobile device when the mobile device is mounted in the cavity.

17 Claims, 9 Drawing Sheets

(56) References Cited

U.S. PATENT DOCUMENTS

| | | | |
|---|---|---|---|
| 7,551,225 B2 | | 6/2009 | Overstreet |
| 8,007,188 B2 | | 8/2011 | Orf |
| 8,014,142 B2 | | 9/2011 | Prest et al. |
| D675,210 S | * | 1/2013 | Kim .................. D14/440 |
| D689,537 S | | 9/2013 | Campbell et al. |
| D695,297 S | | 12/2013 | Sun et al. |
| D696,670 S | | 12/2013 | Schiller et al. |
| 2002/0140847 A1 | | 10/2002 | Alessio et al. |
| 2006/0093348 A1 | | 5/2006 | Squillace |
| 2009/0111543 A1 | | 4/2009 | Tai et al. |
| 2010/0038505 A1 | | 2/2010 | Sonnenberg |
| 2010/0079101 A1 | * | 4/2010 | Sidman ................ 318/649 |
| 2011/0064401 A1 | | 3/2011 | Desorbo |
| 2011/0069947 A1 | | 3/2011 | Orf |
| 2011/0129210 A1 | * | 6/2011 | McGucken ............ 396/422 |
| 2011/0205425 A1 | | 8/2011 | Duncan et al. |
| 2011/0222238 A1 | | 9/2011 | Staats et al. |
| 2012/0043236 A1 | | 2/2012 | Szucs et al. |
| 2012/0062691 A1 | | 3/2012 | Fowler et al. |
| 2012/0321294 A1 | | 12/2012 | Tages et al. |
| 2013/0094846 A1 | | 4/2013 | Apter |

OTHER PUBLICATIONS www.Focalprice.com. https://web.archive.org/web/20120108015640/http://www.focalprice.com/ID395S/Slim_Foldable_Polyurethane_Smart_Cover_for_iPad_2_Gray.html. Archived Jan. 8, 2012. Accessed Jul. 30, 2014.*

U.S. Appl. No. 29/434,285 by Apter, filed Oct. 11, 2012.

Office Action issued Nov. 8, 2013 in U.S. Appl. No. 13/650,335 by Apter.

Makayama product website, www.makayama.com, archived Jan. 12, 2012, https://web.archive.org/web/20120112095553/ http://www.makayama.com/moviemount.html. Accessed Sep. 17, 2014.

www.Focalprice.com. https://web.archive.org/web/20120108015640/http://www.focalprice.com/ID395S/Slim_Foldable_Polyurethane_Smart_Cover_for_iPad_2_Gray.html. Archived Jan. 8, 2012. Accessed Sep. 17, 2014.

Int'l Search Report and Written Opinion issued Jan. 11, 2013 in Int'l Application No. PCT/US2012/059972.

Int'l Preliminary Report on Patentability issued Apr. 15, 2014 in Int'l Application No. PCT/US2012/059972.

iOgrapher Mobile Media Cases, retrieved from the internet at http://www.iographer.com/collections/cases on May 28, 2014 (admitted prior art).

* cited by examiner

Fig. 12
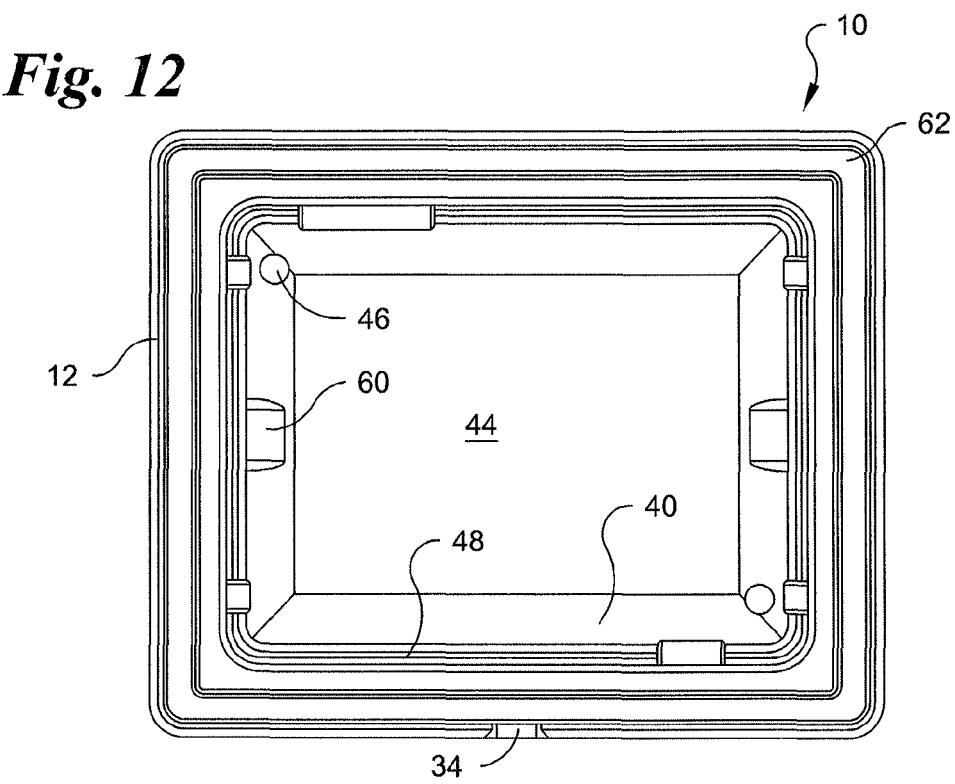
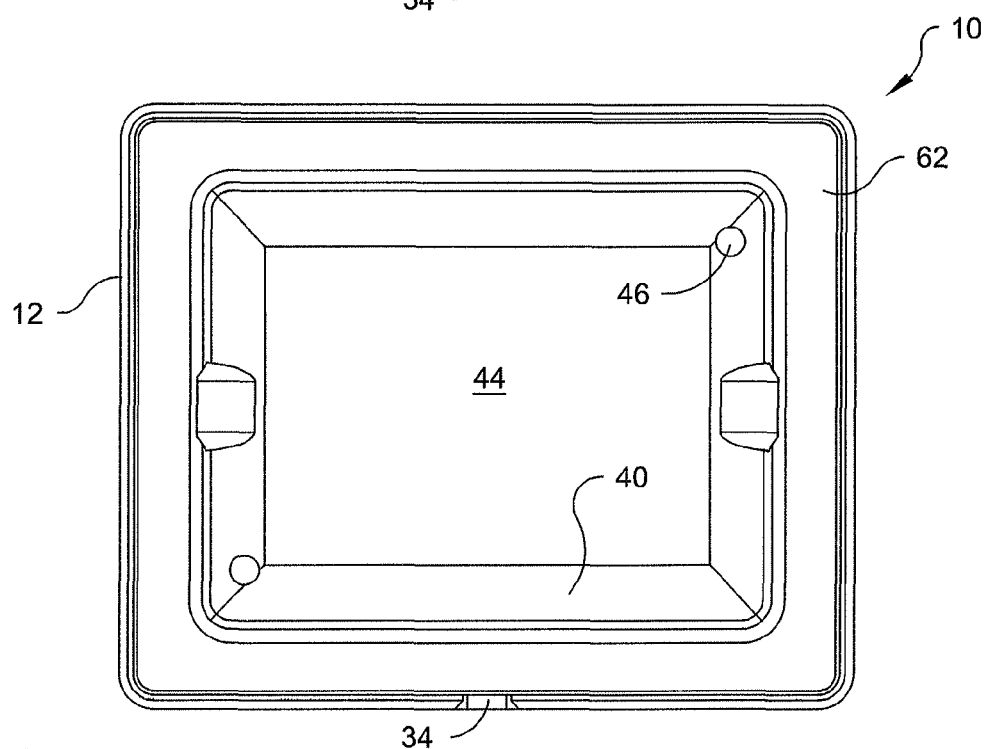
Fig. 13

FRAME AND INSERT FOR MOUNTING A MOBILE DEVICE TO A TRIPOD

CROSS-REFERENCE TO RELATED APPLICATIONS

This application is a continuation of U.S. patent application Ser. No. 13/650,335, filed on Oct. 12, 2012, entitled "Frame and Insert for Mounting Mobile Device to a Tripod," currently pending, which claims the benefit of U.S. Provisional Patent Application No. 61/622,775, filed on Apr. 11, 2012, entitled "Frame and Insert for Mounting Mobile Device to a Tripod," and U.S. Provisional Patent Application No. 61/627,431, filed on Oct. 12, 2011, entitled "The Padcaster." The entire contents of each aforementioned priority application are incorporated by reference herein.

BACKGROUND OF THE INVENTION

An embodiment of the present invention relates generally to an apparatus for mounting a mobile device to a tripod or other support stand, and more particularly, to a frame and a complementary insert for mounting of the mobile device.

Digital camera systems integrated into mobile devices, such as cell phones, personal digital assistants (PDAs), tablet computers, and the like have vastly improved in both image quality and editing features to the point that such mobile devices can be used interchangeably with a traditional dedicated camera. However, the size and configuration of most mobile devices do not allow for the provision of a receiving port for connection with a standard tripod or other support stand. This makes it difficult for the use of the mobile device to capture steady images and/or video. It is also difficult to utilize optional camera accessories with cameras in mobile devices, such as external lights, microphones, and the like.

It is therefore desirable to provide an apparatus that allows a mobile device to be mounted to a standard tripod or support stand and is configured to mount additional accessories.

BRIEF SUMMARY OF THE INVENTION

Briefly stated, an embodiment of the present invention comprises an apparatus for mounting a mobile device on a tripod. The apparatus includes a frame with a rigid peripheral member defining an opening therethrough. The peripheral member includes a mount configured to releasably couple the frame to the tripod. An insert is sized and shaped to be placed into the opening of the frame and releasably engage at least a portion of the peripheral member in an assembled configuration. The insert has a membrane in the form of a cavity configured to releasably receive and support the mobile device. The membrane extends over at least a portion of the opening of the frame in the assembled configuration and includes at least one camera hole extending therethrough that is aligned with a camera lens of the mobile device when the mobile device is mounted in the cavity.

Another embodiment of the present invention comprises an apparatus for mounting one of a plurality of mobile devices on a tripod. The apparatus includes a frame with a rigid peripheral member defining an opening therethrough. The peripheral member includes a mount configured to releasably couple the frame to the tripod. A plurality of inserts are each sized and shaped to be placed into the opening of the frame and releasably engage at least a portion of the peripheral member in an assembled configuration. Each insert has a membrane in the form of a cavity configured to receive and support one of the plurality of mobile devices. The membrane extends over at least a portion of the opening of the frame in the assembled configuration and includes at least one camera hole extending therethrough that is aligned with a camera lens of the one of the plurality of mobile devices when the one of the plurality of mobile devices is mounted in the insert.

Still another embodiment of the present invention comprises an apparatus for interchangeably mounting a mobile device and a camera on a tripod. The apparatus includes a frame with a rigid peripheral member having an inner surface defining an opening therethrough. The peripheral member includes a mount configured to releasably couple the frame to the tripod. At least one threaded hole is formed in the inner surface of the peripheral member and configured to releasably couple the camera to the frame such that the camera is positioned in the opening. An insert is configured to releasably couple the mobile device to the frame when the camera is not positioned in the opening. The insert is sized and shaped to be placed into the opening of the frame and releasably engage at least a portion of the peripheral member in an assembled configuration. The insert has a membrane in the form of a cavity configured to releasably receive and support the mobile device. The membrane extends over at least a portion of the opening of the frame in the assembled configuration and including at least one camera hole extending therethrough that is aligned with a camera lens of the mobile device when the mobile device is mounted in the cavity.

BRIEF DESCRIPTION OF THE DRAWINGS

The following detailed description of preferred embodiments of the invention will be better understood when read in conjunction with the appended drawings. For the purpose of illustration, there is shown in the drawings an embodiment which is presently preferred. It should be understood, however, that the invention is not limited to the precise arrangements and instrumentalities shown.

FIG. 12 is a front elevational view of a device assembled from the frame of FIG. 1 and the insert of FIG. 6 in accordance with a preferred embodiment of the present invention;

FIG. 13 is a rear elevational view of the device of FIG. 12;

DETAILED DESCRIPTION OF THE INVENTION

Figure 1:
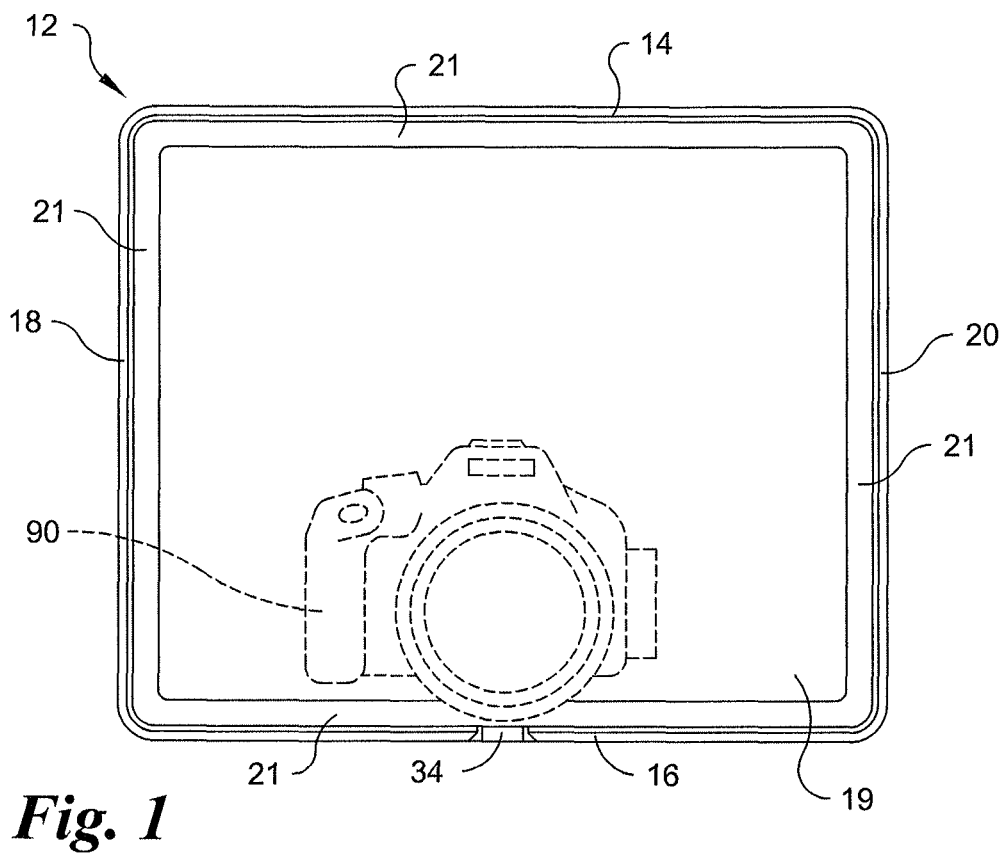
FIG. 1 is front elevational view of a frame in accordance with a preferred embodiment of the present invention.
Figure 2:
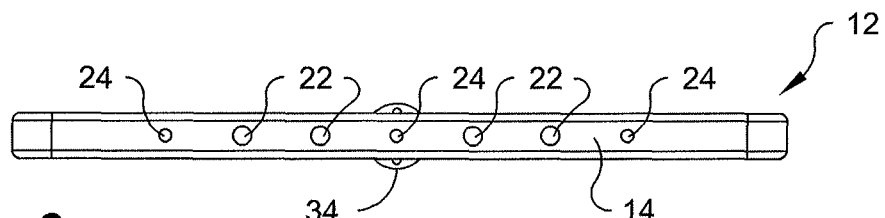
FIG. 2 is a top plan view of the frame of FIG. 1.
Figure 3:
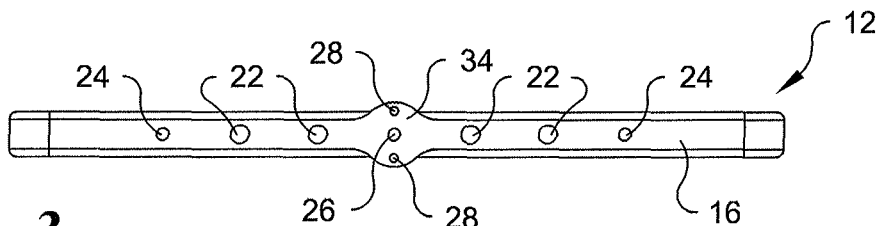
FIG. 3 is a bottom plan view of the frame of FIG. 1.
Figure 4:
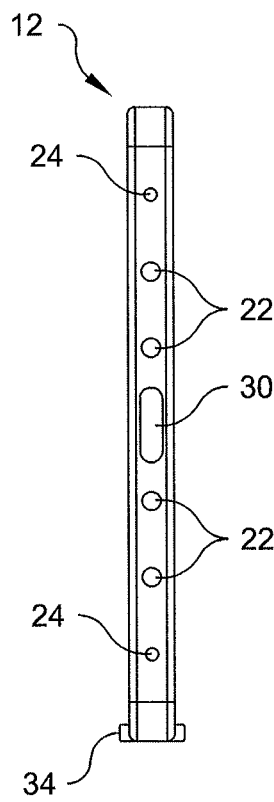
FIG. 4 is a side elevational view of the frame of FIG. 1.

Certain terminology is used in the following description for convenience only and is not limiting. The words "right", "left", "lower", and "upper" designate directions in the drawings to which reference is made. The words "inwardly" and "outwardly" refer to directions toward and away from, respectively, the geometric center of the apparatus and designated parts thereof. The terminology includes the above-listed words, derivatives thereof, and words of similar import. Additionally, the words "a" and "an", as used in the claims and in the corresponding portions of the specification, mean "at least one."

Figure 16:
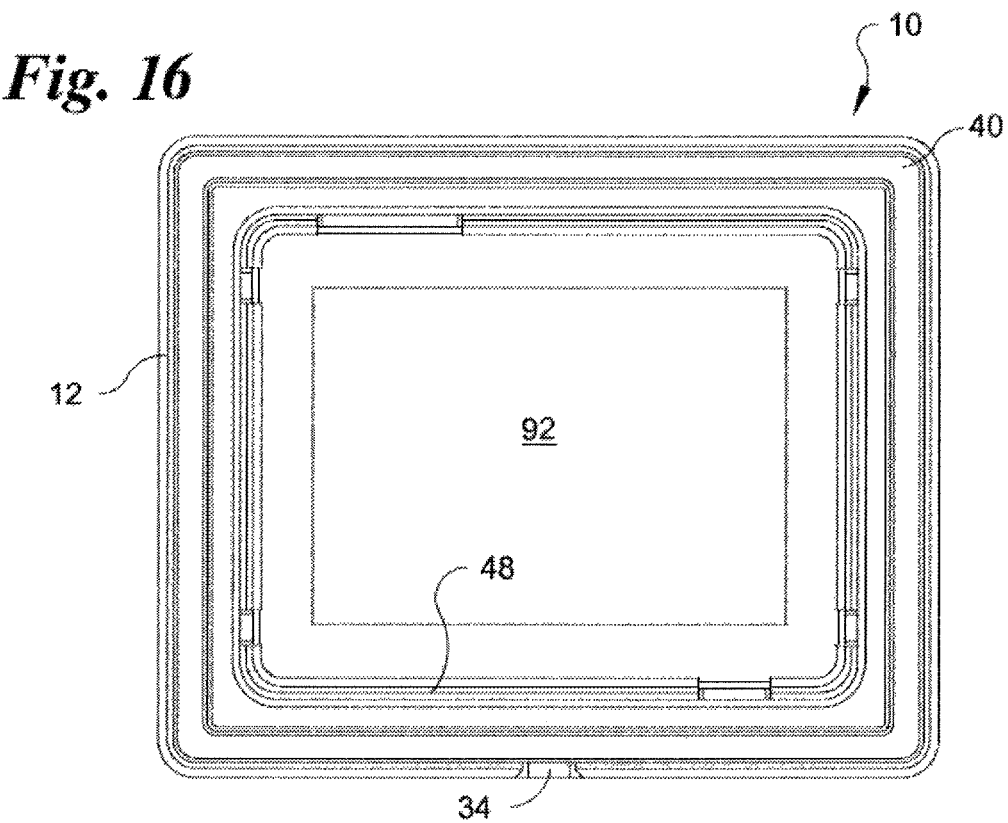
FIG. 16 is a front elevational view of the device of FIG. 12 with a mobile device installed therein.

Referring to the drawings in detail, wherein the same reference numerals indicate like elements throughout, there is shown in FIGS. 12-15 a mounting device 10 configured to receive a mobile device 92 (FIG. 16) for attachment to a tripod or other support stand (not shown). Mounting connections used between a camera and a tripod are described by International Organization for Standardization (ISO) standard 1222:2010, the entire contents of which are incorporated by reference herein. The mounting device 10 is assembled from a frame 12 and an insert 40 mounted within the frame 12, each of which is described in further detail below. Although the mounting device 10 is shown as being rectangular in shape, other shapes may be used as well.

Referring to FIGS. 1-5, the frame 12 includes a rigid peripheral member 14, 16, 18, 20 that is preferably rectangular in shape and includes upper and lower generally parallel horizontal portions 14, 16 connected at their respective ends by generally parallel vertical portions 18, 20. Each of the horizontal and vertical portions 14, 16, 18, 20 includes an inwardly projecting rib 21, which together define an opening 19 of the frame 12. The frame 12 is preferably integrally formed of a cast aluminum alloy, and more preferably from T6 temper 6061 aluminum alloy. Other materials may be used to form the frame 12, such as stainless steel, various plastics (polymeric materials), or other similar lightweight, durable materials. While the frame 12 is preferably integrally formed of one material, the frame 12 may also be made from multiple interconnected pieces, which may encompass different materials. For example, the upper and lower horizontal portions 14, 16 may be welded, glued, fastened, or the like to the vertical portions 18, 20. The frame 12 may also be collapsible for easier storage.

Referring now to FIGS. 2-5, the frame 12 includes, preferably on the horizontal and vertical portions 14, 16, 18, 20, a plurality of threaded accessory holes 22, 24, which are provided for receiving camera accessories (not shown), such as microphones, lights, receivers, monitors, flashes, or the like. As shown in FIGS. 2-5, the threaded accessory holes 22, 24 may vary in diameter and spacing therebetween. Although only two diameters are illustrated in FIGS. 2-5, any number of different diameters may be used for the threaded accessory holes 22, 24. The diameters of the accessory holes 22, 24 are preferably chosen to accommodate standard accessory threaded studs (not shown), which are typically ¼-20 UNC or ⅜-16 UNC. Although threaded accessory holes 22, 24 are shown in the drawings as a preferred method of attaching accessories to the frame 12, other methods may be used, such as unthreaded holes, clips, clamps, or other types of fasteners or the like.

The frame 12 is provided with a mounting plate 34 for attachment of the frame 12 to a tripod or other support stand (not shown). The mounting plate 34 is shown in FIGS. 1-5 as being integrally formed with the frame 12, although the mounting plate 34 may constitute a separate piece that is welded, fastened, or otherwise joined to the frame 12. The mounting plate 34 preferably includes a threaded support hole 26 and two pin holes 28 disposed on opposite sides of the threaded support hole 26. The threaded support hole 26 is preferably configured to receive a standard tripod screw (e.g., ¼-20 UNC or ⅜-16 UNC) (not shown), although other sizes may be used. The pin holes 28 are configured to receive a pin (not shown) on the tripod or support that stabilizes the camera. With a pin hole 28 on either side of the threaded support hole 26, the frame 12 can be mounted facing either direction on a support having a standard screw and pin configuration. Other configurations of the mounting plate 34 may be used to accommodate particular support mounts, as necessary.

Figure 5:
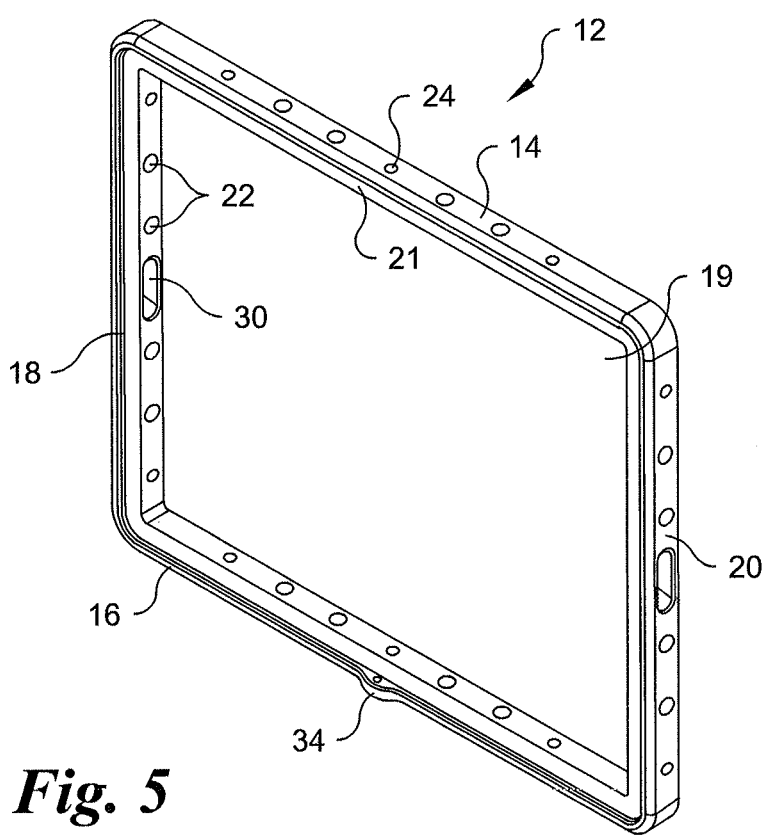
FIG. 5 is a front perspective view of the frame of FIG. 1.
Figure 14:
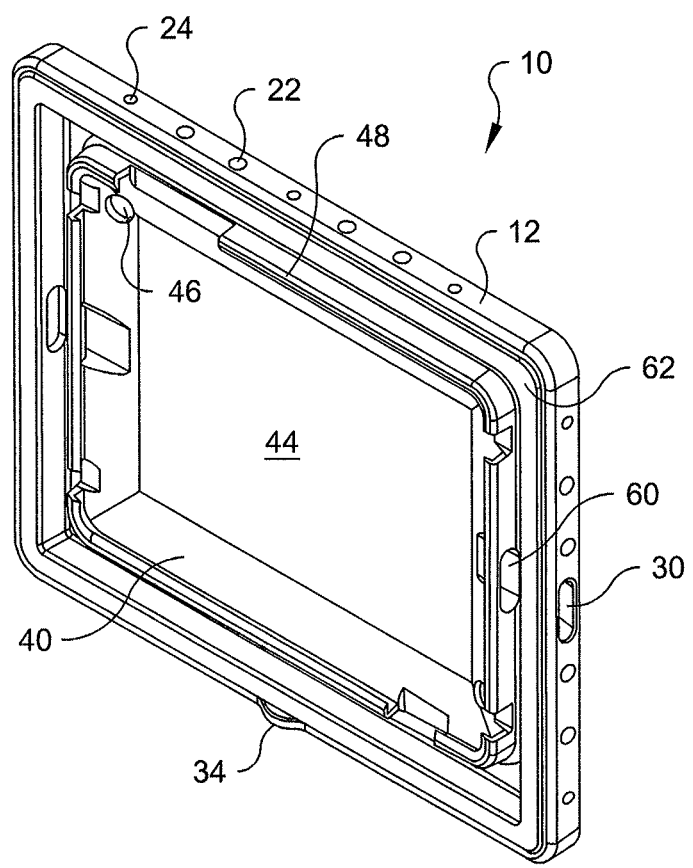
FIG. 14 is a front perspective view of the device of FIG. 12.
Figure 15:
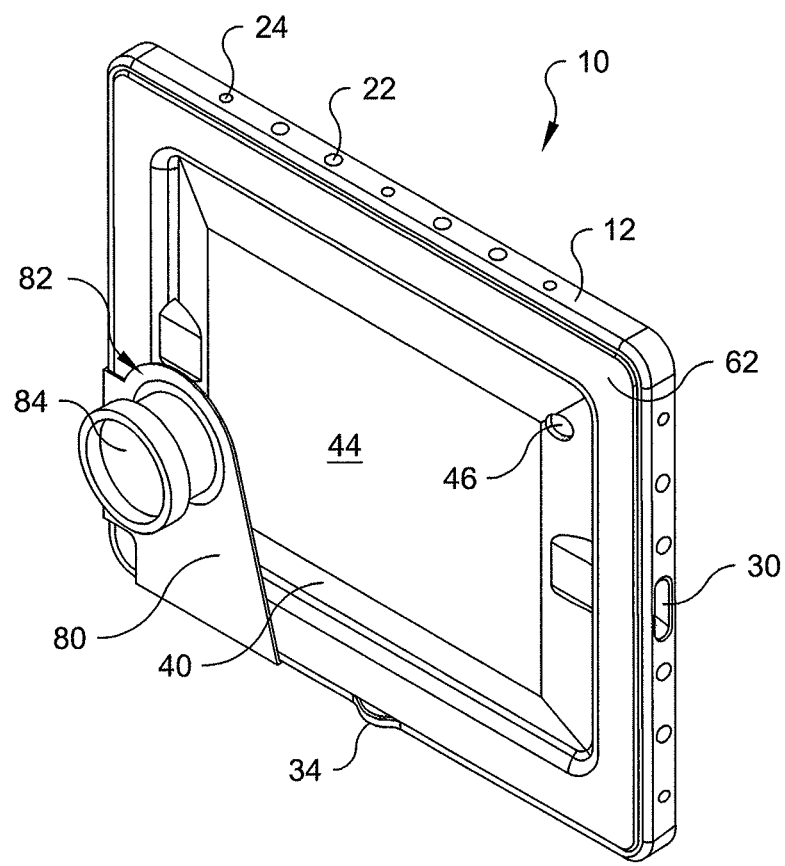
FIG. 15 is a rear perspective view of the device of FIG. 12.

As shown in FIGS. 5 and 14, the frame 12 also preferably includes one or more access through-holes 30 to allow for electrical connections to be made to the mobile device while engaged in the frame 12. For example, through-hole 30 may be used to route a battery charging or power cable (not shown) to the appropriate port of the mobile device. A through-hole 30 is preferably provided on each vertical section of the frame 12 so that the port on the mobile device can be accessed regardless of how the mobile device is mounted. The through-holes 30 can also be used for Ethernet, IEEE 1394, parallel port, PS/2, serial port, USB, VGA, DVI, HDMI, audio, video, or other cables.

Referring to FIGS. 6-11, the mounting device 10 also includes an insert 40 that is preferably releasably engageable with the frame 12 and which is configured to receive the mobile device. More particularly, the insert 40 is sized and shaped to be placed in the opening 19 of the frame 12 and releasably engage at least a portion of the peripheral member 14, 16, 18, 20 in an assembled configuration, as described in more detail below. The insert 40 must be strong enough to maintain the mobile device in a steady configuration for use as a camera, while being soft enough to avoid scratching or otherwise damaging the mobile device. The insert 40 is preferably integrally formed of a polyurethane having a hardness of 80 Shore A. Other soft, resilient materials, such as rubber, plastics (polymers), or the like may be used. Similarly, the insert 40 may be made from multiple pieces assembled together. The insert 40 is preferably shaped to conform to the configuration of a specific mobile device. For example, the insert shown in FIGS. 6-11 is designed to receive an IPAD. In preferred embodiments, multiple inserts 40, each configured to receive a different mobile device such as an IPHONE or generic tablet (not shown), are usable with a single frame 12, although different size frames 12 may also be made available.

Figure 6:
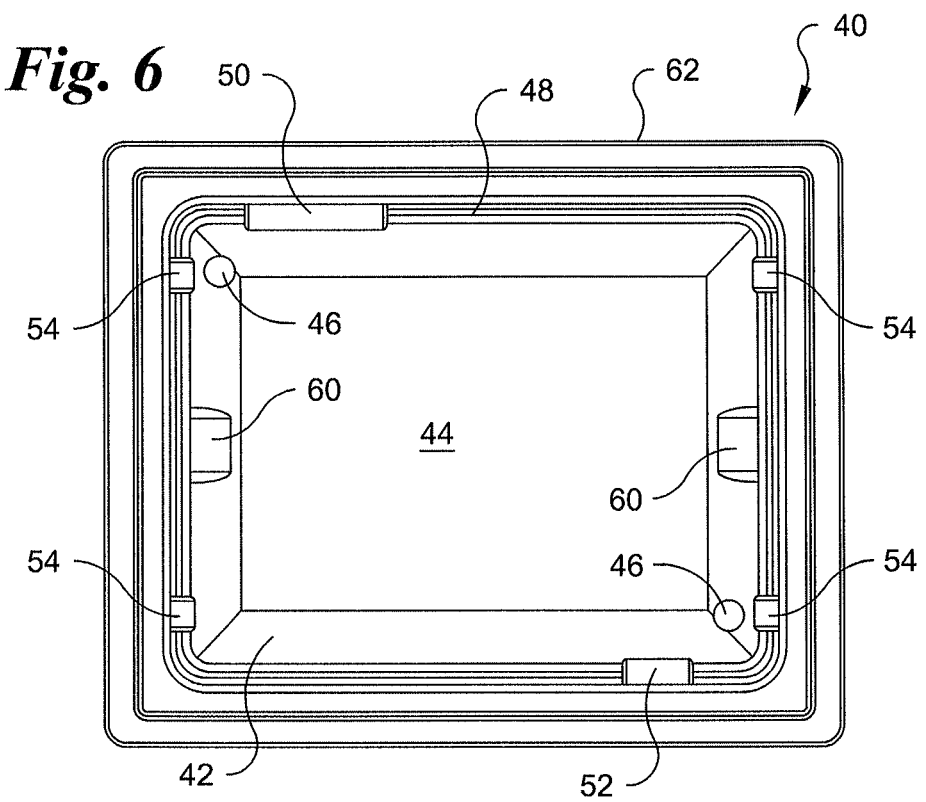
FIG. 6 is a front elevational view of an insert for being positioned within the frame of FIG. 1 in accordance with a preferred embodiment of the present invention.
Figure 7:
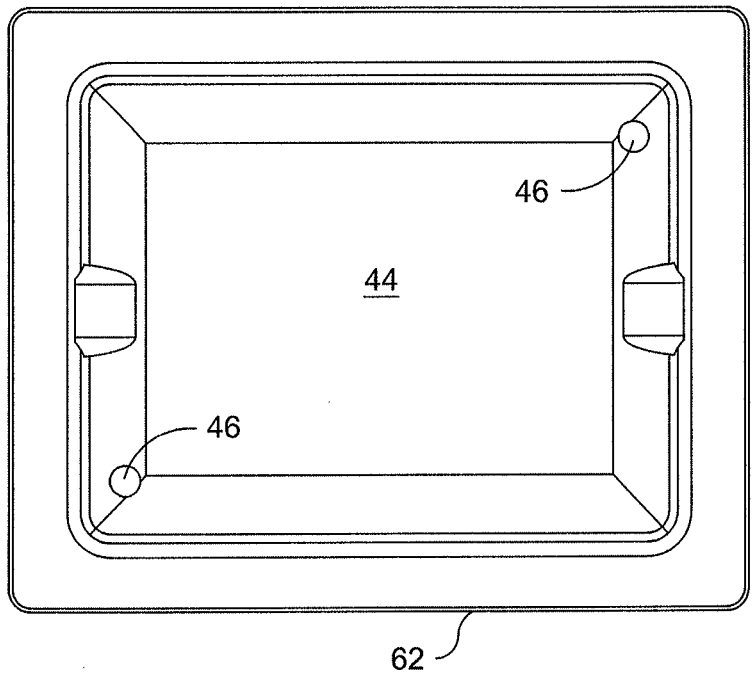
FIG. 7 is a rear elevational view of the insert of FIG. 6.
Figure 8:
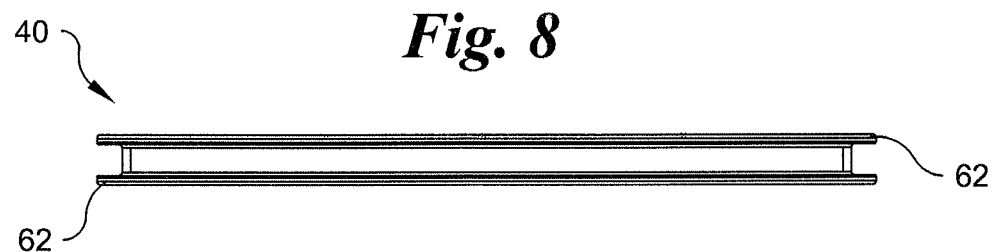
FIG. 8 is a top plan view of the insert of FIG. 6.
Figure 9:
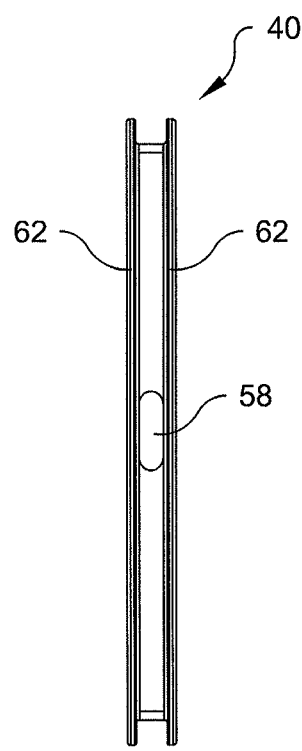
FIG. 9 is a side elevational view of the insert of FIG. 6.
Figure 10:
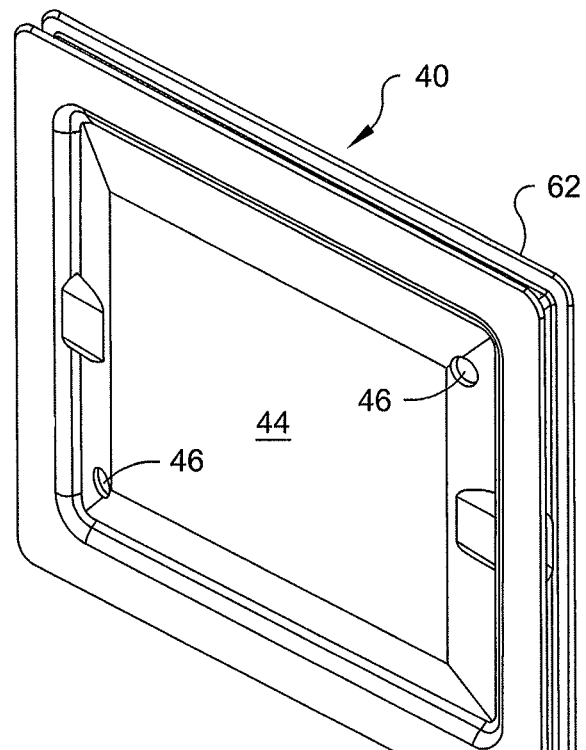
FIG. 10 is a rear perspective view of the insert of FIG. 6.
Figure 11:
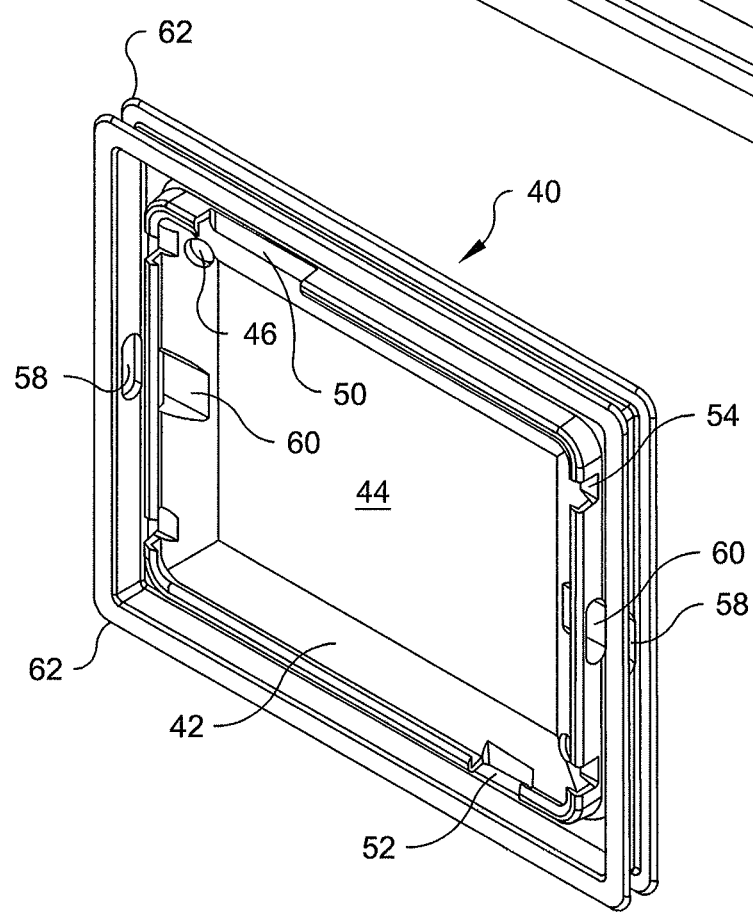
FIG. 11 is a front perspective view of the insert of FIG. 6.

The insert 40 preferably includes a membrane 44 in the form of a cavity 42 into which the mobile device may be introduced and withdrawn, such that the membrane 44 releasably receives and supports the mobile device. In the embodiment shown in FIGS. 6-11, the membrane 44 preferably extends across the entire insert 40, which prevents the mobile device from falling through the rear of the insert 40. The membrane 44 is not required to span the entire insert 40, however. The membrane 44 includes at least one camera hole 46. In use, the mobile device is placed inside the insert 40 with the camera facing the membrane 44. The camera hole 46 is aligned with the camera lens of the mobile device when properly installed to allow for image capture. As seen in FIGS. 6-7, two camera holes 46 are provided in opposite corners of the membrane 44 so that the camera lens may be exposed regardless of the installation position of the mobile device. The cavity 42 may be sized according to the type of mobile device to be retained.

In one preferred embodiment, a lens mount 80 (FIG. 15) may be coupled to the frame 12 via one or more of the threaded accessory holes 22, 24. The lens mount 80 includes a receptacle 82 that, when the lens mount 80 is coupled to the frame 12, is positioned adjacent one of the camera holes 46 opposite to the camera lens of the mobile device. The receptacle 82 is sized and shaped to receive a standard detachable camera lens 84, such as zoom lenses, wide angle lenses, fisheye lenses, telephoto lenses, or the like, for use in conjunction with the camera lens of the mobile device.

The insert 40 further includes an inwardly extending generally flexible flange 48 that extends around a portion of the cavity 42. The flange 48 retains the mobile device within the insert 40. Preferably the cavity 42 has a size substantially equal to the dimensions of the mobile device, or just slightly larger, and at least a portion of the flange 48 projects over the cavity 42 to contact and retain the mobile device. The flange 48 is sufficiently flexible to move outwardly to allow the mobile device to pass into the cavity 42 before returning to its original position. The flange 48 is also sufficiently rigid to retain the mobile device in the cavity 42. A plurality of slots 50, 52, 54 are formed in the flange 48 to allow a user to access buttons, switches, ports, or other features of the mobile device while it is disposed within the insert 40. The slots 50, 52, 54 may be sized and oriented to be compatible with specific mobile devices. For example, first slot 50 is provided to allow access to volume controls and a slide switch on the IPAD periphery. Second slot 52 allows access to, for example, a SIM card slot. Third slots 54 are provide for power switches and earphone jacks.

Although a flexible flange 48 is shown as the preferred method for retaining the mobile device within the insert 40, other methods may used. For example, rotatable or pivotable fasteners, clamps, straps, or the like may be used.

The insert 40 further includes on vertical portions thereof a through-hole 58 which aligns with the corresponding through-hole 30 of the frame 12 when the insert 40 is disposed therein. The through-hole 58 of the insert 40 cooperates with a slot 60 passing through the flange 48 to allow the power or other cable to pass through the frame 12 and the insert 40 to be connected to the mobile device.

The insert 40 also includes a pair of protruding flexible rails 62 extending around a periphery of the insert 40. The rails 62 may be bent to allow the insert 40 to pass into the opening 19 of the frame 12. The rails 62 wrap around the ribs 21 of the frame 12 to lock the insert 40 into position. The ribs 21 are preferably dimensioned such that, as seen in FIGS. 12-15, the front and rear surfaces of the insert 40 are mounted flush with the front and rear surfaces of the frame 12. Although the preferred mechanism for retaining the insert 40 is the interaction of the flexible rails 62 and ribs 21, other methods may be used. For example, rotatable or pivotable fasteners, clamps, straps, or the like may be used.

While the frame 12 has been described for use with the insert 40, the frame 12 may also be utilized to mount a standard camera 90. (shown in phantom in FIG. 1) to a tripod for use with multiple accessories, resulting in what is commonly referred to as a "DSLR cage." The camera 90 may be releasably mounted within the opening 19 with one of the threaded accessory holes 22, 24 of the frame 12. In this manner, the frame 12 may be used interchangeably for mounting a camera 90 or a mobile device in the insert 40.

From the foregoing, it can be seen that embodiments of the present invention comprise a mounting device for adapting a mobile device for use with a tripod or other support stand. It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. An apparatus for mounting a mobile device on a tripod, the apparatus comprising:
   (a) a frame with a rigid peripheral member defining a rectangular opening therethrough, the peripheral member including a mount configured to releasably couple the frame to the tripod; and
   (b) an adapter sized and shaped to be placed into the rectangular opening of the frame and releasably engage at least a portion of the peripheral member in an assembled configuration, the adapter comprising a membrane having a portion that defines a cavity that conforms to the mobile device, releasably receives and supports the mobile device, the membrane extending over at least a portion of the rectangular opening of the frame in the assembled configuration and including at least one camera hole extending therethrough that is aligned with a camera lens of the mobile device when the mobile device is mounted in the cavity.

2. The apparatus of claim 1, wherein the peripheral member is rectangular in shape and includes a set of parallel spaced-apart first portions and a set of parallel spaced-apart second portions joining the set of first portions together at terminal ends thereof, the second portions being oriented generally perpendicularly to the first portions.

3. The apparatus of claim 1, wherein the peripheral member includes at least one threaded accessory hole therein configured to releasably couple one or more camera accessories to the frame.

4. The apparatus of claim 3, wherein the one or more camera accessories includes a lens mount releasably couplable to at least one of the threaded accessory holes and having a receptacle aligned with the at least one camera hole and configured to receive a lens.

5. The apparatus of claim 3, wherein a thread size of the at least one threaded accessory hole is one of ¼-20 UNC or ⅜-16 UNC.

6. The apparatus of claim 1, wherein the membrane includes at least one inwardly extending flexible flange that extends around at least a portion of the cavity, the flange being configured to retain the mobile device within the cavity when the mobile device is mounted in the adapter.

7. The apparatus of claim 6, wherein the flange includes at least one slot that is aligned with a feature of the mobile device when the mobile device is mounted in the adapter.

8. The apparatus of claim 1, wherein the mount is a mounting plate having a threaded support hole and at least one pin hole formed therein, the threaded support hole being configured to releasably engage a screw of the tripod, the at least one pin hole being configured to receive therein a pin of the tripod.

9. The apparatus of claim 8, wherein a thread size of the threaded support hole is one of ¼-20 UNC or ⅜-16 UNC.

10. The apparatus of claim 1, wherein the peripheral member of the frame includes an access through-hole arranged therein aligned with a feature of the mobile device when the mobile device is mounted in the adapter.

11. The apparatus of claim 10, wherein the adapter includes a through hole aligned with the through-hole of the frame in the assembled configuration.

12. The apparatus of claim 1, wherein the adapter includes two camera holes disposed in diametrically opposed locations on the membrane.

13. The apparatus of claim 1, wherein the adapter comprises polyurethane.

14. The apparatus of claim 1, wherein the peripheral member of the frame comprises an aluminum alloy.

15. An apparatus for mounting one of a plurality of mobile devices on a tripod, the apparatus comprising:
(a) a frame with a rigid peripheral member defining a rectangular opening therethrough, the peripheral member including a mount configured to releasably couple the frame to the tripod; and
(b) a plurality of adapters each sized and shaped to be placed into the rectangular opening of the frame and releasably engage at least a portion of the peripheral member in an assembled configuration, each adapter comprising a membrane having a portion that defines a cavity that conforms to, receives and supports one of the plurality of mobile devices, the membrane extending over at least a portion of the rectangular opening of the frame in the assembled configuration and including at least one camera hole extending therethrough that is aligned with a camera lens of the one of the plurality of mobile devices when the one of the plurality of mobile devices is mounted in the adapter.

16. An apparatus for interchangeably mounting a mobile device and a camera on a tripod, the apparatus comprising:
(a) a frame with a rigid peripheral member having an inner surface defining a rectangular opening therethrough, the peripheral member including a mount configured to releasably couple the frame to the tripod;
(b) at least one threaded hole formed in the inner surface of the peripheral member and configured to releasably couple the camera to the frame such that the camera is positioned in the rectangular opening; and
(c) an adapter configured to releasably couple the mobile device to the frame when the camera is not positioned in the rectangular opening, the adapter being sized and shaped to be placed into the rectangular opening of the frame and releasably engage at least a portion of the peripheral member in an assembled configuration, the adapter comprising a membrane having a portion that defines a cavity that conforms to the mobile device, releasably receives, and supports the mobile device, the membrane extending over at least a portion of the rectangular opening of the frame in the assembled configuration and including at least one camera hole extending therethrough that is aligned with a camera lens of the mobile device when the mobile device is mounted in the cavity.

17. The apparatus of claim 16, wherein the peripheral member includes at least one threaded accessory hole therein configured to releasably couple one or more camera accessories to the frame.

* * * * *